United States Patent [19]

Pedrizetti

[11] Patent Number: 5,642,481
[45] Date of Patent: Jun. 24, 1997

[54] METHOD AND SYSTEM FOR VALIDATING A MEMORY WINDOW IN SYSTEM ADDRESS SPACE

[75] Inventor: Raymond D. Pedrizetti, Issaquah, Wash.

[73] Assignee: Microsoft Corporation, Redmond, Wash.

[21] Appl. No.: 412,558

[22] Filed: Mar. 29, 1995

[51] Int. Cl.$^6$ .................................................. G06F 11/34
[52] U.S. Cl. ........................................ 395/185.01; 395/284
[58] Field of Search ........................ 395/185.01, 185.02, 395/280, 281, 282, 283, 284, 500, 700, 800; 364/929

[56] References Cited

U.S. PATENT DOCUMENTS

| | | | |
|---|---|---|---|
| 4,905,182 | 2/1990 | Fitch et al. | 364/900 |
| 4,931,923 | 6/1990 | Fitch et al. | 364/200 |
| 5,056,060 | 10/1991 | Fitch et al. | 395/282 |
| 5,161,102 | 11/1992 | Griffin et al. | 395/800 |
| 5,371,892 | 12/1994 | Petersen et al. | 395/700 |
| 5,448,710 | 9/1995 | Liu | 395/497.03 |
| 5,450,570 | 9/1995 | Richek et al. | 395/500 |
| 5,497,490 | 3/1996 | Harada et al. | 395/700 |
| 5,519,851 | 5/1996 | Bender et al. | 395/500 |
| 5,530,858 | 6/1996 | Stanley et al. | 395/650 |
| 5,553,245 | 9/1996 | Su et al. | 395/284 |

*Primary Examiner*—Robert W. Beausoliel, Jr.
*Assistant Examiner*—Albert Decady
*Attorney, Agent, or Firm*—Jones & Askew

[57] ABSTRACT

The present invention provides a system and method for validating system address space for adapter cards having an information structure of a predefined format. Validation is accomplished by verifying the predefined format of the information structure via a memory window. Because verification is conducted via a memory window, it is only successful when the address space of the memory window is free of control by other components of the computer that would otherwise have interfered with verification. Thus, only a memory window that is suitable for adapter card allocation is validated.

18 Claims, 3 Drawing Sheets

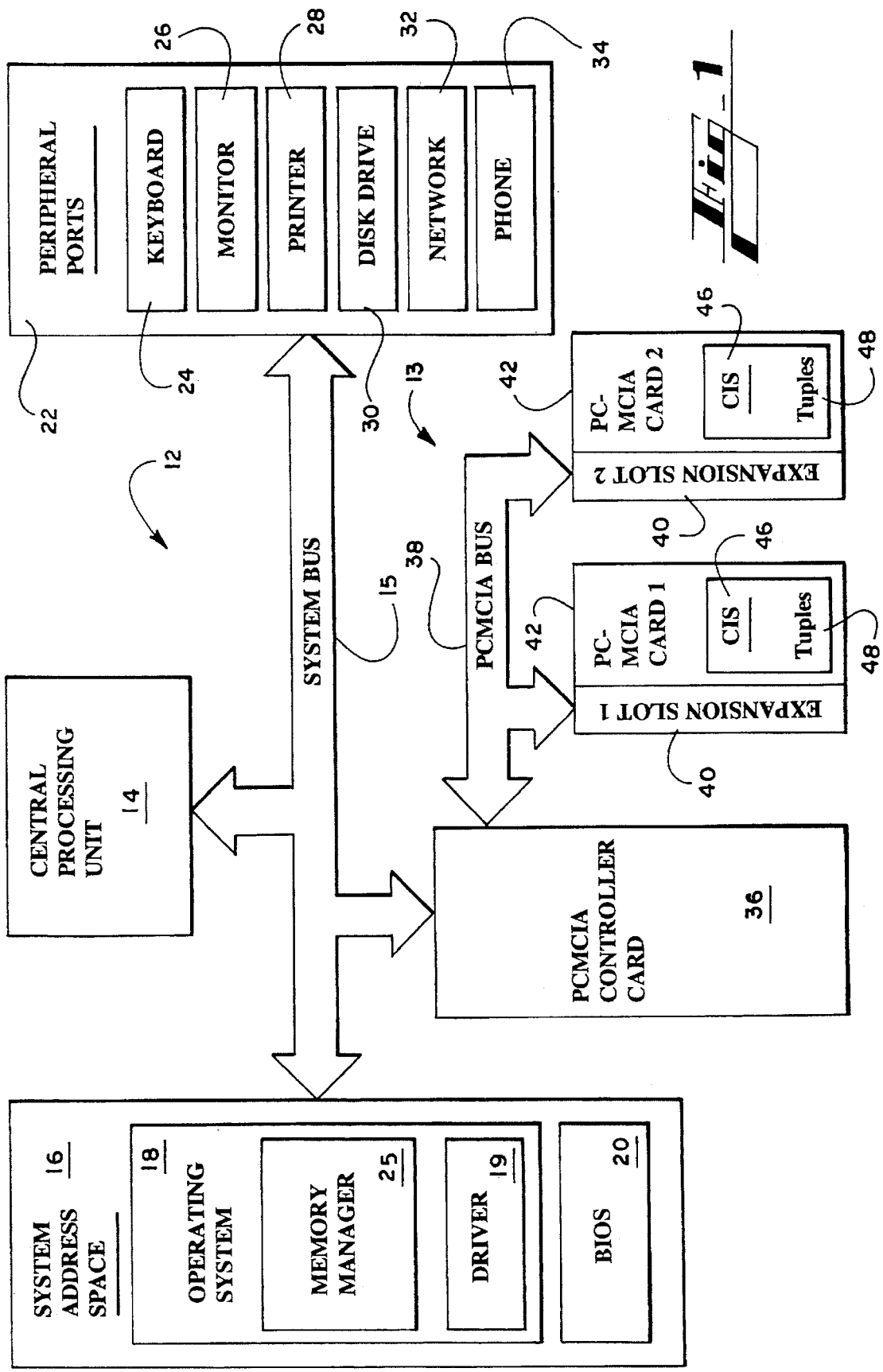

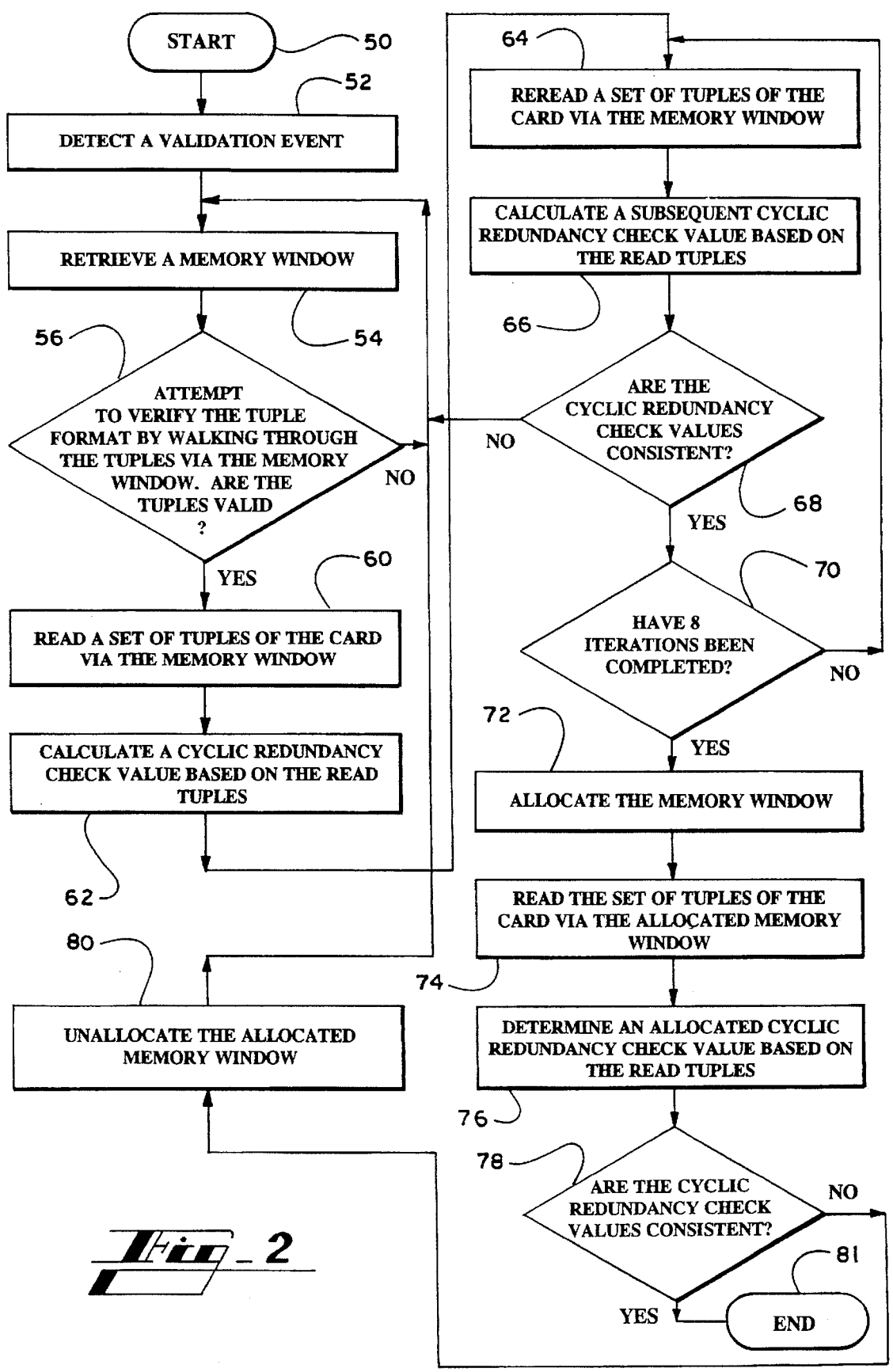
Fig_2

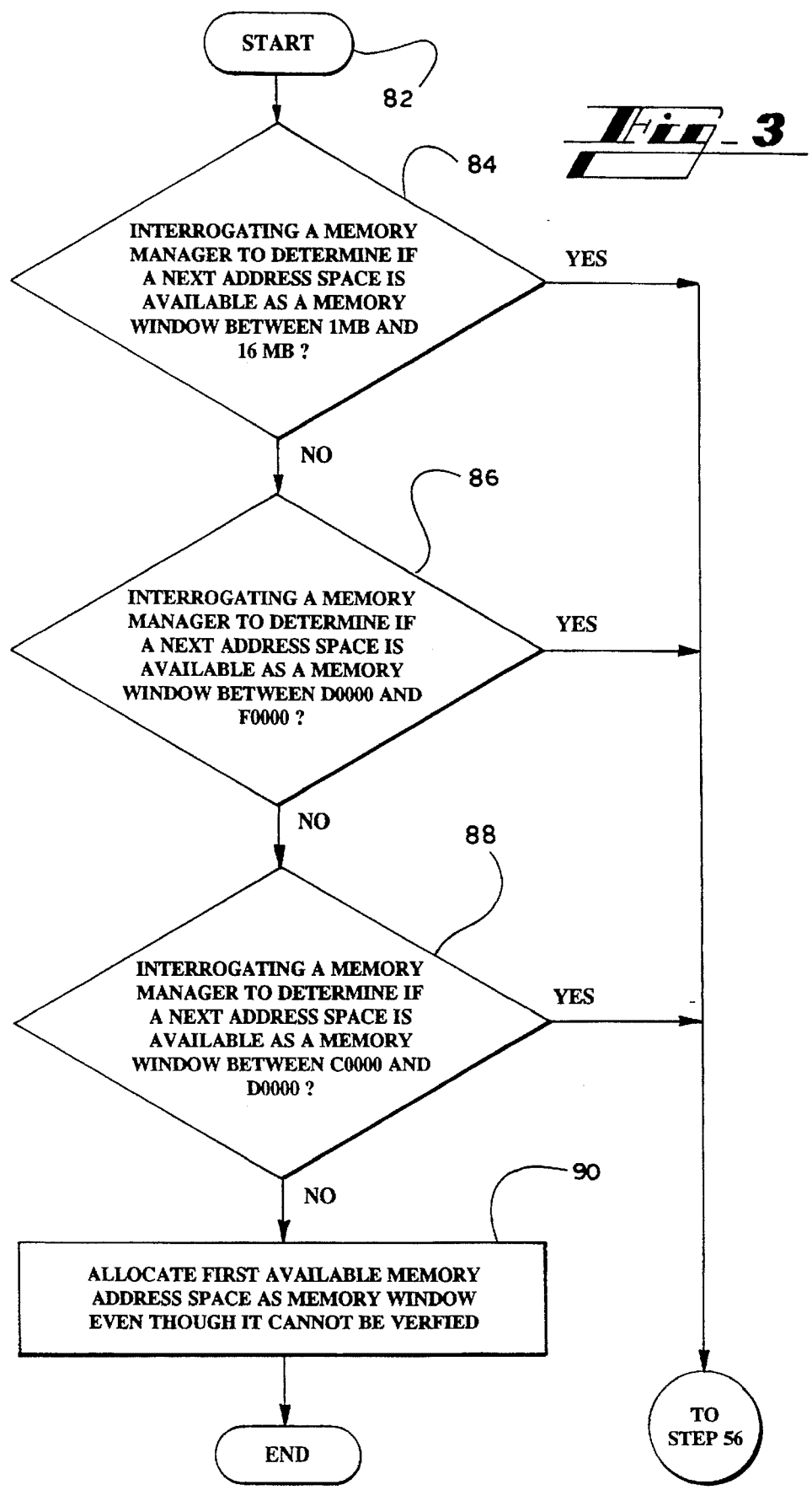

METHOD AND SYSTEM FOR VALIDATING A MEMORY WINDOW IN SYSTEM ADDRESS SPACE

TECHNICAL FIELD

The present invention relates generally to adapter cards for computing devices, and more particularly to an improved system for, and method of, validating a memory window in system address space to support adapter card configuration.

BACKGROUND OF THE INVENTION

From the late 1970's to the present day, the use of computers has proliferated in businesses, homes, academia, and a multitude of other environments. This proliferation has been due, in part, to the development of standardized computers that can be mass produced at affordable costs and that include expansion capabilities to support user customization.

A standardized computer typically comprises a power supply, a central processing unit, system address space, input/output ports, and a card expansion system. The components of the computer communicate with one another by transmitting and receiving signals on a system bus, which is a group of electrical connections between the components.

Each component on the bus has its own address or set of addresses and electronically monitors the bus for signals coded with that address. Thus, each component receives all signals that are transmitted on the bus, but responds only to signals with its address or set of addresses.

Card expansion systems typically comprise a plurality of expansion slots connected to the system bus by means of an expansion bus. The expansion bus may be of a variety of bus standards, such as Industry Standard Architecture (ISA), Extended Industry Standard Architecture (EISA), Small Computer Systems Interface (SCSI) or Personal Computer Memory Card International Association (PCMCIA). These bus standards and others were developed by the computer industry to allow a variety of adapter cards to be designed for operation with computer systems through expansion busses.

As used herein, the phrase "adapter card" means a card having a circuit board for installation in an expansion slot of a computing device such that it operates in conjunction with the computer system to perform certain functions. Common types of adapter cards are video display adapters, disk controllers, expanded memory boards, serial/parallel adapters, mouse controllers, network links and communication adapters.

When an adapter card is inserted into an expansion slot of a computer, the card must be configured by allocating to the card, or to a controller of the card if one is present, certain system resources with which it can communicate with other components of the computer. Such system resources include interrupts, direct memory access (DMA) channels, memory addresses, and input/output (I/O) ports. Interrupts allow the adapter card to interrupt the central processing unit, suspend the current program and execute a set of instructions associated with the interrupt. A direct memory access (DMA) channel allows the adapter card to address memory without the assistance of the central processing unit. Memory addresses permit access to the card through system address space. The input/output ports allow access to the card through input/output address space.

In the past, the resources assigned to adapter cards were generally configured manually by a user. Manual configuration often presented a complex series of technical tasks because many personal computers cannot determine which components are connected to the computer. Furthermore, the connected components often failed to detect conflicts when another component attempted to share the same resource. Accordingly, a user typically had to resolve a resource conflict by first identifying the problem and thereafter experimenting with hardware and software configurations in an attempt to correct the resource conflict.

More recently, a computer-implemented process for dynamically configuring adapter cards in a computer system has been developed. This computer-implemented configuration process is disclosed by U.S. patent application Ser. No. 08/250,698, which is commonly assigned with this application and is incorporated herein by reference. In accordance with the process disclosed in U.S. patent application Ser. No. 08/250,698, adapter cards are configured by automatically collecting information from a card about its configuration when the card is inserted into an expansion slot. On the basis of this information, the computer system then allocates resources to configure the card.

Before a computer system can obtain configuration information from a card, however, an address space, or "memory window", must be allocated to the card from system address space. The memory window enables communications between the computer system and the card via the system bus by providing an address for transmitting and receiving information.

Address space that is available for allocation to support adapter card configuration is typically listed by a memory manager of the computer system. As used herein, the phrase available address space means system address space that is listed by a computer system as available for adapter card allocation, regardless of the actual suitability of the address space for such allocation.

A problem associated with allocating available address space as a memory window is that the space may already be associated with another component of the computer. Such allocation of address space creates a problem because configuration information received through such a memory window will be inaccurate due to interference from the other component, with which the address space is already associated.

For example, an address space associated with a read only memory (ROM) socket may appear available when a ROM device is not plugged into the socket. However, decoding logic of the ROM socket will attempt to drive the bus through the socket's bus drivers when information is communicated through that address space. Thus, if that address space is allocated as a memory window for the computer system to communicate with an adapter card, the configuration information received through the memory window will be inaccurate due to the interference caused by the ROM socket's bus drivers.

At present, however, no means exist for determining whether available address space is free address space. As used herein, the term free address space means system address space that is free from interference caused by other components of the computer system. Therefore, a need exists in the art for a system for, and method of, validating system address space in a computer system to support adapter card configuration.

SUMMARY OF THE INVENTION

The present invention provides a better solution to solving the problems in the art described above by providing a method and system for validating system address space for adapter cards having an information structure of a predefined format. Validation is accomplished by verifying the predefined format of the information structure via a memory window. Because verification is conducted via a memory window, it is only successful when the address space of the memory window is free of control by other components of the computer that would otherwise have interfered with verification. Thus, only a memory window that is suitable for adapter card allocation is validated.

In response to a validation event, the method and system of the present invention first retrieve an available address space as a memory window. The information structure of an adapter card is then verified via the memory window as having a predefined format. If the information structure is not of the predefined format as verified via the memory window, it is assumed that the memory window is associated with another component of the computer and is not suitable for allocation to support adapter card configuration. Accordingly, a next available address space is retrieved as another memory window until the information structure of the adapter card is verified via a memory window as having the predefined format.

Thus, it is an object of the present invention to provide a system for, and method of, validating a memory window in system address space.

It is another object of the present invention to provide a system for, and method of, validating a memory window for adapter cards having an information structure of a predefined format.

It is a further object of the present invention to provide a system for, and method of, validating a memory window for adapter cards having an information structure of a predefined format to support adapter card configuration.

Further objects, features and advantages of the present invention will become apparent upon reviewing the following description of the preferred embodiments of the invention, when taken in conjunction with the drawings and appended claims.

BRIEF DESCRIPTION OF THE DRAWING

FIG. 1 is a diagrammatic view of the components of a computer system used in connection with the preferred embodiment of the present invention for validating a memory window.

FIG. 2 is a logical flow diagram of the process for validating a memory window in accordance with the present invention.

FIG. 3 is a logical flow diagram of the process for retrieving a memory window for validation in accordance with the present invention.

DETAILED DESCRIPTION

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

This invention will be described with specific reference to a system for, and method of, validating a memory window to support PCMCIA (Personal Computer Memory Card International Association) adapter card configuration. The standards for PCMCIA adapter cards and associated systems are incorporated herein by reference and may be obtained from the Personal Computer Memory Card International Association, 1030 E. Duane, Suite G, Sunnyvale, Calif. 94086. However, this invention should be also understood as applicable to validating a memory window to support configuration of other types of adapter cards that have a predefined information structure.

Referring now in more detail to the drawings, in which like numerals refer to like parts throughout the several views, FIG. 1 shows the components of the preferred operating environment, a computer system 12 with a PCMCIA card expansion system 13. The computer system 12 comprises a central processing unit (CPU) 14 that operates the computer system 12 in conjunction with an operating system 18 to retrieve, process, store and display data.

The CPU 14 is typically implemented as a microprocessor, such as the models 80386 or 80486 manufactured by Intel Corporation, Santa Clara, Calif. The CPU 14 communicates control, address, and data signals with the operating system 18 and with the remaining components of the computer system 12 through a system bus 15.

The operating system 18 comprises a set of computer programs that control the internal functions of the computer system 12, thereby allowing the computer 12 to run application software (not shown). In the preferred embodiment, the operating system 18 includes a memory manager 25, from which available address space can be ascertained. It will be understood by those skilled in the art, however, that the present invention can directly ascertain available address space by well known methods if the operating system 18 does not include a memory manager 25.

The operating system 18 is installed in a mass storage device, such as a hard disk drive, a floppy disk drive, or a ROM chip. During boot up (initialization) of the computer system 12, the operating system 18 is loaded into system address space 16.

In the preferred embodiment, the operating system 18 is a graphic-based operating system capable of automatically configuring adapter cards. To accommodate automatic adapter card configuration, the preferred operating system 18 includes a driver 19 for detecting the insertion or removal of adapter cards from the computer system 12 and for allocating configuration resources. The function and operation of the driver 19 are described in detail in U.S. patent application Ser. No. 08/250,698, which is already incorporated herein by reference.

An example of an operating system capable of automatically configuring adapter cards is the "WINDOWS 95" operating system, which is due to be released by the assignee in this application, Microsoft Corporation, Redmond, Wash. Further information regarding the "WINDOWS 95" operating system and its automatic adapter card configuration is available from a variety of publications, including INSIDE WINDOWS 95 by Adrian King, which is published by Microsoft Press and incorporated herein by reference.

A basic input/output system (BIOS) program 20 is stored in system address space 16 along with the operating system 18. The BIOS program 20 supplies the device-level control or support services for the primary input/output devices of the computer during the boot "initialization" process. After a boot, the BIOS program 20 accepts requests from application programs and from the operating system 18 running on the computer system 12 and performs input/output services as requested by those programs. These functions and operations of conventional BIOS programs are well known and will not be further described herein.

A series of peripheral ports 22 are provided for receiving, transmitting and displaying data. Data is received through a keyboard port 24, an external disk drive port 30, or a network port 32. Data is transmitted from the computer system 12 through the network port 32 and a phone port 34, which is typically connected to a modem (not shown). A monitor port 26 and a printer port 28 allow data to be displayed in electronic and printed form, respectively.

The PCMCIA card expansion system 13 comprises a controller card 36 connected by a PCMCIA expansion bus 38 to a pair of expansion slots 40 for receiving PCMCIA adapter cards 42. The controller card 36 is connected to the system bus 15 and interfaces the CPU 14 with the PCMCIA adapter cards 42. Thus, the controller card 36 receives, processes and retransmits information between the PCMCIA adapter cards 42 and the system bus 15. Therefore, the CPU 14 accesses the PCMCIA adapter cards 42 through the controller card 36, and it is the controller card 36 to which a memory window must be allocated for adapter card configuration. The controller card 36, in turn, maps the allocated memory window onto the adapter cards 42 during the configuration process. It will be understood by those skilled in the art, however, that a memory window can be directly allocated for each adapter card when they communicate directly with the system bus 15.

The PCMCIA adapter cards 42 each include a card information structure (CIS) 46 containing a series of predefined information structures called tuples 48. The tuples 48 are of variable length and are stored in tuple sets. Each tuple 48 starts with a byte tuple code, which is usually followed by a link byte that indicates the relative offset to the next tuple of the set. The byte tuple code is not followed by a link byte when the next tuple immediately follows or when the present tuple is the last of a tuple set.

In the preferred embodiment, the process of the present invention for validating system address space to support adapter card configuration is installed in a mass storage device, such as a hard disk drive, a floppy disk drive, or a ROM chip. During configuration operations, the memory validation sequence is loaded into system address space 16 and executed by the CPU 14. It will be understood by those skilled in the art, however, that the process of the present invention can be stored in the controller card 36 or in each adapter card when no controller card 36 is present.

As shown by FIG. 2, the method of the present invention for validating adapter cards begins at step 50 and proceeds to step 52. At step 52 a validation event is detected. In the preferred embodiment, the validation events are the generation of an interrupt signal when a first PCMCIA adapter card 42 is inserted into an expansion slot 40 or during the first boot of a computer system 12 that has a preinstalled PCMCIA adapter card 42. If an interrupt signal is not generated upon the insertion of a PCMCIA adapter card 42, the expansion slots 40 are intermittently polled by the driver 19 to determine if a PCMCIA adapter card 42 has been inserted. The expansion slots 40 are preferably polled every two seconds in such a case.

Upon the occurrence of a validation event, a next available address space is identified from the memory manager 25 and retrieved as a memory window at step 54, the process for which is described below in detail. As used herein, the phrase next available address space means the first address space available above either a preset starting address or a previous address space that failed validation. Furthermore, the term retrieve means to get, either by actively procuring or by receiving.

The memory window to be validated is preferably 4 kilobytes in size. It will be understood by those skilled in the art, however, that the size of the memory window can be varied within the scope of the present invention.

Proceeding to decisional step 56, an attempt is made to verify the format of the tuples 48 via the memory window. The purpose of verifying the tuple format is to test the memory window for interference caused by bus contention, which would result in a verification failure. Thus, the present invention assumes that the tuples 48 of the PCMCIA adapter card 42 are of the proper predefined format and thus that a failure of verification is due to interference with the memory window.

Verification of the tuple format is attempted by walking through all the tuples 48 of the PCMCIA adapter card 42 via the memory window. As used herein the phrase walking through means to step through the tuple sets one at a time looking for control tuples that indicate a link to other tuple sets and counting the valid tuple sets. Verification is successful if at least one valid set of tuples exists and the tuple sets can be walked through without an error.

An error occurs if the first tuple is not a CISTPL-DEVICE tuple and one of the following three exceptions does not apply, which are allowed for compatibility with existing CIS 46 structures. First, the CISTPL-DEVICE tuple may be preceded by an arbitrary number of CISTPL-NULL tuples. Second, if attribute memory is separate from common memory, the first tuple in attribute memory can be a CISTPL-END tuple if common memory begins with a CISTPL-LINKTARGET tuple. Attribute and common memory are different areas of memory specified by the PCMCIA architecture of the adapter card 42. Third, to support old cards formatted by the "MEMCARD" utility, which is sold by the assignee in this application, Microsoft Corporation, Redmond, Wash., the first tuple may also be a CISTPL-LINKTARGET tuple. In each of these exceptions, the CISTPL-DEVICE tuple must follow the exceptions.

Additionally, an error occurs if the target of a link tuple does not start with a CISTPL-LINKTARGET tuple. Thus, if the target is not valid, an error occurs. Furthermore, an error occurs if more than 256 tuples are walked through because that is the predefined limit.

If the format of the tuples 48 is verified, the YES branch of decisional step 56 leads to step 60. If an error occurs and the tuple format could not be verified, it is assumed that the memory window is not free of bus contention, and the NO branch of decisional step 56 returns to step 54 where another memory window is retrieved.

At step 60, a tuple set is read via the memory window. A cyclic redundancy check value is then calculated at step 62 from the tuple set that was read at step 60. Next, at step 64 the tuple set is reread via the memory window. At step 66, a subsequent cyclic redundancy check value is calculated from the tuple set that was read at step 64. It will be understood by those skilled in the art that another type of error detection method can be used within the scope of the present invention.

Proceeding to decisional step 68, it is determined whether the subsequent cyclic redundancy check value is consistent with the cyclic redundancy check value. If the cyclic redundancy check values are not consistent, the NO branch of decisional step 68 returns to step 54 where another memory window is retrieved. If the cyclic redundancy check values are consistent, the subsequent cyclic redundancy check value becomes the cyclic redundancy check value, and the YES branch of decisional step 68 leads to decisional step 70.

At decisional step 70, it is determined whether eight (8) iterations, for determining if the subsequent error detection value is consistent with the error detection value, have been completed. If eight (8) iterations have not been completed, the NO branch of decisional step 70 returns to step 64 where the tuple set is reread via the memory window. If eight (8) iterations have been completed, the YES branch of decisional step 70 leads to step 72.

At step 72, the memory window is allocated to support adapter card configuration. The perfunctory steps of allocation are preferably carried out by the operating system 18. Thus, as used herein, the term allocate means to allocate the memory window or to instruct the proper component of the computer system 12 to allocate the memory window. Proceeding to step 74, the tuple set is read via the allocated memory window. An allocated cyclic redundancy check value is then calculated at step 76 from the tuple set that was read at step 74. Due of the length of time that the mechanics of allocation require, the allocated cyclic redundancy check provides a last check that is especially useful because it is further spaced apart in time than the earlier cyclic redundancy checks.

Step 76 leads to decisional step 78 where it is determined whether the allocated redundancy check value is consistent with the redundancy check value. If the redundancy check values are not consistent, the NO branch of decisional step 78 leads to step 80 where the allocated memory window is unallocated. Step 80 returns to step 54 where another memory window is retrieved. If the redundancy check values are consistent at decisional step 78, validation is complete with no bus contention having been detected for the memory window, and the YES branch leads to the end of the validation process at step 81.

As best shown by FIG. 3, the process for retrieving a memory window begins at step 82 and proceeds to decisional step 84. At decisional step 84, the memory manager 25 is interrogated to determine if a next address space is available between the 1 Meg and the 16 Meg addresses of system address space 16. If a next address space is available between the 1 Meg and the 16 Meg addresses, that next address space is retrieved as the memory window, and the YES branch of decisional step 84 returns to step 56 for validation of the memory window. If a next address space is not available between the 1 Meg and the 16 Meg addresses, the NO branch of decisional step 84 leads to decisional step 86.

At decisional step 86, the memory manager 25 is interrogated to determine if a next address space is available between the D0000 and the F0000 addresses of system address space 16. If a next address space is available between the D0000 and the F0000 addresses, that next address space is retrieved as the memory window, and the YES branch of decisional step 86 returns to step 56 for validation of the memory window. If a next address space is not available between the D0000 and the F0000 addresses, the NO branch of decisional step 86 leads to decisional step 88.

At decisional step 88, the memory manager 25 is interrogated to determine if a next address space is available between the C0000 and the D0000 addresses of system address space 16. If a next address space is available between the C0000 and the D0000 addresses, that next address space is retrieved as the memory window, and the YES branch of decisional step 88 returns to step 56 for validation of the memory window. If a next address space is not available between the C0000 and the D0000 addresses, the NO branch of decisional step 88 leads to step 90.

It will be understood that step 90 is reached only when a memory window from the system address space 16 could not be validated. In such a case, the first available address space between the 1 Meg and the 16 Meg addresses is allocated as a default.

It will be further understood that the order in which the memory manager 25 is interrogated for available address space may be varied within the scope of the present invention. Interrogating the memory manager 25 first for available address space between the 1 Meg and the 16 Meg addresses is preferred because that region of system address space 16 is most likely to have a valid memory window. Similarly, the region of system address space 16 between the D0000 and the F0000 addresses is more likely to have a valid memory window than the region between the C0000 and the D0000 addresses. The remaining regions of system address space 16 are unlikely to have a valid memory window.

From the foregoing description of the preferred embodiments and the several alternatives, other alternative constructions of the present invention may suggest themselves to those skilled in the art. Therefore, the scope of the present invention is to be limited only to the claims below and the equivalents thereof.

I claim:

1. A method of validating system address space of a computer system comprising the steps of:
   (a) detecting a validation event;
   (b) retrieving a next address space as a memory window;
   (c) attempting to verify via the memory window that an information structure of an adapter card is of a predefined format;
      (1) if the information structure is of the predefined format, going to step (d); otherwise
      (2) returning to step (b);
   (d) reading the information structure via the memory window;
   (e) calculating an error detection value based on the read information;
   (f) rereading the information structure via the memory window;
   (g) calculating a subsequent error detection value based on the reread information; and
   (h) determining if the subsequent error detection value is consistent with the error detection value;
      (1) if the subsequent error detection value is consistent with the error detection value, allocating the memory window; otherwise
      (2) returning to step (b).

2. The method of validating system address space of a computer system as recited in claim 1 further comprising the steps of:
   (i) reading the information structure via the allocated memory window;
   (j) calculating an allocated error detection value based on the information read via the allocated memory window; and
   (k) determining if the allocated error detection value is consistent with the error detection value, if the allocated error detection value is not consistent with the error detection value, unallocating the memory window and returning to step (b).

3. A method of validating system address space of a computer system comprising the steps of:
   (a) detecting a validation event;
   (b) retrieving a next address space as a memory window;
   (c) attempting to verify via the memory window that an information structure of an adapter card is of a predefined format;
      (1) if the information structure is of the predefined format, going to step (d); otherwise
      (2) returning to step (b);
   (d) reading the information structure via the memory window;
   (e) calculating an error detection value based on the read information;
   (f) rereading the information structure via the memory window;
   (g) calculating a subsequent error detection value based on the reread information;
   (h) determining if the subsequent error detection value is consistent with the error detection value;
      (1) if the subsequent error detection value is consistent with the error detection value, the subsequent error detection value becoming the error detection value and going to step (i); otherwise
      (2) returning to step (b);
   (i) determining if N iterations of determining if the subsequent error detection value is consistent with the error detection value have been completed;
      (1) if N iterations have been completed, going to step (j); otherwise
      (2) returning to step (f); and
   (j) allocating the memory window.

4. The method of validating system address space of a computer system as recited in claim 3 wherein N is an integer between, and including 3 and 10.

5. The method of validating system address space of a computer system as recited in claim 3 wherein N is an integer of 8.

6. The method of validating system address space of a computer system as recited in claim 3 further comprising the steps of:
   (k) reading the information structure via the allocated memory window;
   (l) calculating an allocated error detection value based on the information read via the allocated memory window; and
   (m) determining if the allocated error detection value is consistent with the error detection value, if the allocated error detection value is not consistent with the error detection value, unallocating the memory window and returning to step (b).

7. The method of validating system address space of a computer system as recited in claim 1 or 3 wherein the adapter card is a PCMCIA card having at least one tuple of the predefined format.

8. The method of validating system address space of a computer system as recited in claim 7 wherein the predefined format of the information structure is verified by walking through the tuples of the PCMCIA card.

9. The method of validating system address space of a computer system as recited in claim 1 or 3 wherein the memory window is 4 kilobytes in size.

10. The method of validating system address space of a computer system as recited in claim 1, 2, 3 or 6 wherein the error detection value, the subsequent error detection value, and the allocated error detection value are calculated by a cyclic redundancy check.

11. The method of validating system address space of a computer system as recited in claim 1 or 3 wherein retrieving a next address space as a memory window as recited in step (b) comprises the steps of:
   (b) (1) interrogating a memory manager to determine if a next address space is available above an address of M in a system address space;
      (A) if a next address space is available above the M address, retrieving the next address space as the memory window and going to step (c); otherwise
      (B) going to step (b)(2);
   (2) interrogating a memory manager to determine if a next address space is available below the M address in system address space;
      (A) if a next address space is available below the M address, retrieving the next address space as the memory window and going to step (c); otherwise
      (B) no memory window could be verified, going to step (b)(3); and
   (3) reinterrogating the memory manager and allocating a first available address space above the M address.

12. The method of validating system address space of a computer system as recited in claim 11 wherein M is an address of 1 Meg.

13. The method of validating system address space of a computer system as recited in claim 1 or 3 wherein retrieving a next address space as a memory window as recited in step (b) comprises the steps of:

(b) (1) interrogating a memory manager to determine if a next address space is available between an address of M and an address of L in a system address space;

(A) if a next address space is available between the M and the L addresses, retrieving the next address space as the memory window and going to step (c); otherwise (B) going to step (b)(2);

(2) interrogating a memory manager to determine if a next address space is available between an address of Q and an address of R in system address space;

(A) if a next address space is available between the Q and the R addresses, retrieving the next address space as the memory window and going to step (c); otherwise (B) going to step (b)(3);

(3) interrogating a memory manager to determine if a next address space is available between an address of P and the address of Q in system address space;

(A) if a next address space is available between the P and the Q addresses, retrieving the next address space as the memory window and going to step (c); otherwise (B) no memory window could be verified, going to step (b)(4); and (4) reinterrogating the memory manager and allocating a first available address space between the M and the L addresses.

14. The method of validating system address space of a computer system as recited in claim 13 wherein M is an address of 1 Meg, L is an address of 16 Meg, P is a hexadecimal address of C0000, Q is a hexadecimal address of D0000 and R is a hexadecimal address of F0000.

15. A system for validating system address space of a computer system comprising:

(a) a central processing unit connected to system address space of a computer system by a system bus;

(b) an expansion slot for receiving an adapter card with an information structure having a predefined format, the expansion slot connected to the system bus;

(c) means for retrieving a next address space as a memory window;

(d) means for verifying via the memory window that the information structure of the adapter card is of the predefined format;

(e) means for allocating the memory window through which the information structure has been verified as having the predefined format;

(f) means for reading the information structure via the memory window at different time intervals;

(g) means for calculating an error detection value based on the read information at each time interval; and (h) means for determining if the error detection values are consistent with one another.

16. The system for validating system address space of a computer system as recited in claim 15 further comprising:

(i) means for reading the information structure via the allocated memory window;

(j) means for calculating an allocated error detection value based on the information read via the allocated memory window;

(k) means determining if the allocated error detection value is consistent with the error detection value; and (l) means for unallocating the memory window if the allocated error detection value is not consistent with the error detection value.

17. The system for validating system address space of a computer system as recited in claim 15 further comprising a controller card connected to the central processing unit and the system address space by the system bus, and wherein the expansion slot is connected to the system bus through the controller card.

18. The system for validating system address space of a computer system as recited in claim 17 wherein the adapter card is a PCMCIA card having at least one tuple of the predefined format.

* * * * *